US009975478B2

(12) United States Patent
Zhou et al.

(10) Patent No.: US 9,975,478 B2
(45) Date of Patent: May 22, 2018

(54) BACKLIGHT SOURCE FOR INSTRUMENT, ITS OPERATING METHOD, AND INSTRUMENT

(71) Applicants: BOE TECHNOLOGY GROUP CO., LTD., Beijing (CN); BEIJING BOE CHATANI ELECTRONICS CO., LTD., Beijing (CN)

(72) Inventors: Zhendong Zhou, Beijing (CN); Jinze Li, Beijing (CN); Dongsheng Yang, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 1 day.

(21) Appl. No.: 15/039,248

(22) PCT Filed: Nov. 12, 2015

(86) PCT No.: PCT/CN2015/094427
§ 371 (c)(1),
(2) Date: May 25, 2016

(87) PCT Pub. No.: WO2016/197534
PCT Pub. Date: Dec. 15, 2016

(65) Prior Publication Data
US 2017/0158124 A1 Jun. 8, 2017

(30) Foreign Application Priority Data
Jun. 9, 2015 (CN) .......................... 2015 1 0312784

(51) Int. Cl.
*B60Q 3/14* (2017.01)
*B60Q 3/18* (2017.01)

(52) U.S. Cl.
CPC ................ *B60Q 3/14* (2017.02); *B60Q 3/18* (2017.02)

(58) Field of Classification Search
CPC ............... B60Q 3/14; B60Q 3/18; B60Q 3/10
See application file for complete search history.

(56) References Cited

U.S. PATENT DOCUMENTS

| 7,501,939 | B1 * | 3/2009 | Belikov | ................ | B60K 35/00 340/438 |
| 2004/0070964 | A1 | 4/2004 | Lo | | |
| 2016/0221440 | A1 * | 8/2016 | Tane | ...................... | B60K 35/00 |

FOREIGN PATENT DOCUMENTS

| CN | 1737577 A | 2/2006 |
| CN | 2808645 Y | 8/2006 |

(Continued)

OTHER PUBLICATIONS

First Chinese Office Action dated Nov. 28, 2016; Appln. No. 201510312784.6.

(Continued)

*Primary Examiner* — Hongmin Fan
(74) *Attorney, Agent, or Firm* — Ladas & Parry LLP

(57) ABSTRACT

A backlight source for instrument includes a backlight source region and a pointer region. The backlight source region includes at least two sub-regions, each of which is provided with a backlight source independently. The pointer region is provided with an instrument pointer. When the instrument pointer is turned into one of the at least two sub-regions, the backlight source which corresponds to the sub-region emits light individually. Thus, the backlight source is saved and the energy consumption is reduced. Backlight sources corresponding to different sub-regions emit light of different colors, and the backlight sources of different colors are sequentially arranged according to warning degree and thus can have a warning function. Further, an (Continued)

operation method of backlight source for instrument and an instrument are further provided.

17 Claims, 6 Drawing Sheets

(56) References Cited

FOREIGN PATENT DOCUMENTS

| | | | |
|---|---|---|---|
| CN | 102092340 | A | 6/2011 |
| CN | 102737731 | A | 10/2012 |
| CN | 202557403 | A | 11/2012 |
| CN | 203844614 | U | 9/2014 |
| CN | 104875619 | A | 9/2015 |
| DE | 19914597 | A1 | 10/2000 |
| EP | 2028634 | A1 | 2/2009 |
| JP | 2007-093391 | A | 4/2007 |
| JP | 4178671 | B2 | 11/2008 |

OTHER PUBLICATIONS

International Search Report arid Written Opinion dated Mar. 15, 2016; PCT/CN2015/094427.

\* cited by examiner

US 9,975,478 B2

BACKLIGHT SOURCE FOR INSTRUMENT, ITS OPERATING METHOD, AND INSTRUMENT

TECHNICAL FIELD

Embodiments of the present disclosure relate to a backlight source for instrument and its operating method, and an instrument.

BACKGROUND

A conventional backlight source for instrument is a single integrated backlight source. When the instrument is in operation, the whole backlight source is in a state of emitting light, thereby causing a waste of backlight source and ultimately increasing energy consumption.

SUMMARY

At least one embodiment of the present disclosure provides a backlight source for instrument, comprising a backlight source region and a pointer region, the backlight source region surrounding the pointer region and comprising at least two sub-regions each of which is provided with a backlight source individually;

the pointer region has an instrument pointer provided therein;

the backlight source region is configured such that when the instrument pointer is turned into one of the at least two sub-regions, the backlight source which is provided in the sub-region is illuminated individually.

In one embodiment of the present disclosure, backlight sources provided in adjacent sub-regions among the at least two sub-regions emit light of different colors.

In one embodiment of the present disclosure, each of the at least two sub-regions is provided with a contact structure independently, which comprises a first metal contact and a second metal contact, the first metal contact is connected with a first electrode of the backlight source and the second metal contact is connected with a second electrode of the backlight source;

the pointer region is provided with a probe structure comprising a first conductive probe and a second conductive probe, the first conductive probe and the second conductive probe are fixedly disposed with respect to the instrument pointer, the first conductive probe is connected with a first electrode of a power supply, and the second conductive probe is connected with a second electrode of the power supply;

when the instrument pointer is rotated into one of the sub-regions, the first metal contact corresponding to the one of the sub-regions is connected with the first conductive probe, while the second metal contact corresponding to the one of the sub-regions is connected with the second conductive probe.

In one embodiment of the present disclosure, the first conductive probe and the second conductive probe are fixedly disposed with respect to the instrument pointer through a rotation shaft.

In one embodiment of the present disclosure, the contact structure is disposed close to the pointer region, the first metal contact is disposed above the second metal contact, and the first conductive probe has its bottom disposed above the bottom of the second conductive probe, so that the probe structure and the contact structure are matched with each other.

In one embodiment of the present disclosure, the contact structures of the at least two sub-regions are spaced apart from each other, the first conductive probe has a width in an arranging direction of adjacent first metal contacts greater than an interval between adjacent first metal contacts, and the second conductive probe has a width in an arranging direction of adjacent second metal contact greater than an interval between adjacent second metal contacts.

In one embodiment of the present disclosure, the contact structure further comprises a first insulating layer which is disposed between the first metal contact and the second metal contact.

In one embodiment of the present disclosure, the contact structure further comprises a second insulating layer and a third insulating layer, the second insulating layer is disposed above the first metal contact, and the third insulating layer is disposed below the second metal contact.

In one embodiment of the present disclosure, each of the at least two sub-regions has the same shape and/or area.

At least one embodiment of the present disclosure provides an instrument comprising any one of the backlight source for instrument as described above.

At least one embodiment of the present disclosure provides an operation method of a backlight source for instrument, the backlight source for instrument comprising a backlight source region and a pointer region, the backlight source region surrounding the pointer region and comprising at least two sub-regions each of which is provided with a backlight source independently, the pointer region provided with an instrument pointer, the operation method comprising:

when the instrument pointer is turned into one of the at least two sub-regions, the backlight source which is provided in the sub-region emits light individually.

In one embodiment of the present disclosure, each of the at least two sub-regions is provided with a contact structure which comprises a first metal contact and a second metal contact, the first metal contact is connected with a first electrode of the backlight source and the second metal contact is connected with a second electrode of the backlight source;

the pointer region is provided with a probe structure comprising a first conductive probe and a second conductive probe, the first conductive probe and the second conductive probe are fixedly connected with the instrument pointer, the first conductive probe is connected with a first electrode of a power supply, and the second conductive probe is connected with a second electrode of the power supply;

the step in which when the instrument pointer is turned into one of the at least two sub-regions, the backlight source which is provided in the sub-region emits light individually comprises:

when the instrument pointer is turned into the sub-region, the first metal contact corresponding to the sub-region is connected with the first conductive probe, while the second metal contact corresponding to the sub-region is connected with the second conductive probe.

In the backlight source for instrument, the operation method thereof, and the instruments according to embodiments of the present disclosure, the backlight source for instrument comprising a backlight source region and a pointer region, the backlight source region comprising at least two sub-regions each of which is provided with a backlight source independently; the pointer region has an instrument pointer provided therein; when the instrument pointer is turned into one of the at least two sub-regions, the backlight source which is provided in the sub-region is illuminated individually. Thereby backlight source is saved and power consumption is reduced.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiment One

Figure 1:
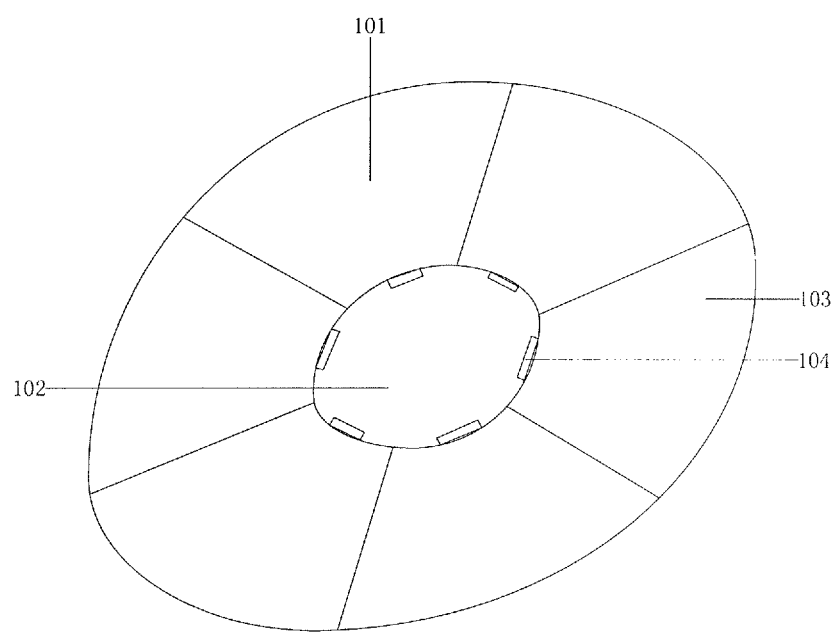
FIG. 1 is an illustrative structural view of a backlight source for instrument according to Embodiment One of the present disclosure.

FIG. 1 is an illustrative structural view of a backlight source for instrument according to Embodiment One of the present disclosure. As illustrated in FIG. 1, the backlight source for instrument comprises a backlight source region 101 and a pointer region 102. The backlight source region 101 surrounds the pointer region 102 and comprises at least two sub-regions 103, each of which is provided with a backlight source 104 separately. Optionally, there are two, three or six sub-regions 103, and the backlight source 104 is a light emitting diode. For example, the backlight source region 101 is an annular region, and the pointer region 102 is a circular region. The annular region 101 and the circular region 102 have the same center. Optionally, there are six sub-regions 103, and the six sub-regions 103 have the same area. That is to say, the six sub-regions 103 are completely the same in size and in shape.

Figure 2:
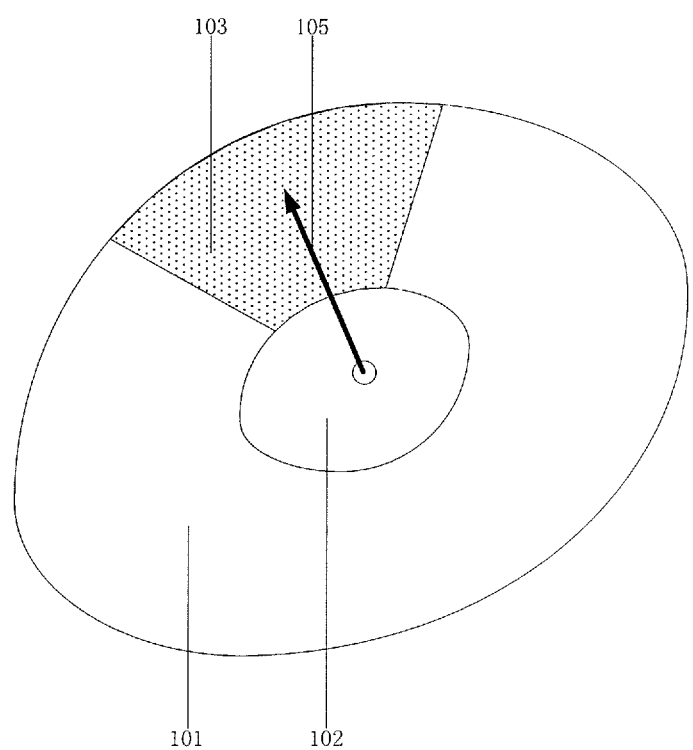
FIG. 2 is a view illustrating emitting light of the backlight source corresponding to the instrument pointer in Embodiment One.

FIG. 2 is a view illustrating illumination state of the backlight source corresponding to the instrument pointer according to Embodiment One. As illustrated in FIG. 2, the pointer region 102 is provided with an instrument pointer 105. For example, the instrument pointer 105 is disposed in the center of the annular region and the circular region. When the instrument pointer 105 is turned into one of the sub-regions 103, the backlight source which corresponds to the sub-region 103 emits light individually, and thus the backlight source is saved and the energy consumption is reduced.

Figure 3:
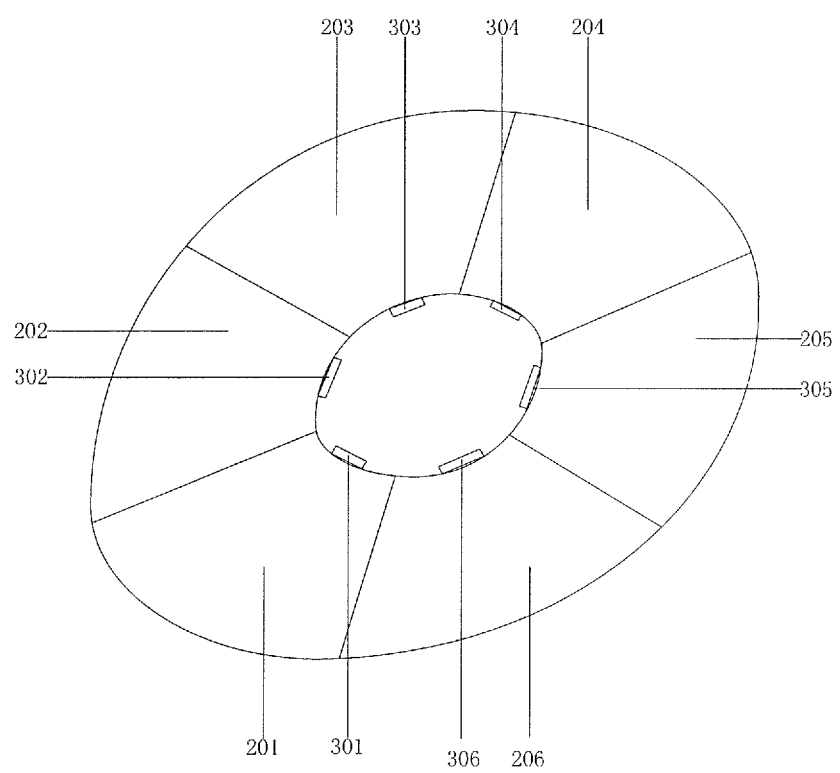
FIG. 3 is a view illustrating color distribution of the backlight source region in Embodiment One.

FIG. 3 is a view illustrating color distribution of the backlight source region according to Embodiment One. As illustrated in FIG. 3, the backlight source region is an annular region and the pointer region is a circular region, and the annular region and the circular region have the same center. In the embodiment, the backlight sources corresponding to adjacent sub-regions emit light of different colors. Optionally, the number of the sub-regions is six, the six sub-regions have the same area, and the backlight sources corresponding to different sub-regions emit light of different colors. For example, the sub-regions are in turn configured as a blue sub-region 201, a green sub-region 202, a yellow-green sub-region 203, a yellow sub-region 204, an orange sub-region 205, and a red sub-region 206 in a clockwise direction. The backlight source corresponding to the blue sub-region 201 is a blue light emitting diode 301. The backlight source corresponding to the green sub-region 202 is a green light emitting diode 302. The backlight source corresponding to the yellow-green sub-region 203 is a yellow-green light emitting diode 303. The backlight source corresponding to the yellow sub-region 204 is a yellow light emitting diode 304. The backlight source corresponding to the orange sub-region 205 is an orange light emitting diode 305. And the backlight source corresponding to the red sub-region 206 is a red light emitting diode 306.

Of course, the backlight source region can be a sector region, the pointer region can also be a sector region, and the backlight source region surrounds the pointer region. In this case, the backlight source region is divided into a plurality of sub-regions along a circumferential direction, and each sub-region has the same area. For example, the backlight source region of a sector shape can be divided into six different sub-regions and the colors of the sub-regions can be set according to the color distribution described above.

In the present embodiment, backlight sources corresponding to different sub-regions emit light of different colors, and the backlight sources of different colors are sequentially arranged according to warning degree and thus have a warning function. For example, when the backlight source for instrument according to the present embodiment is used in a car dashboard, different vehicle speeds are indicated by the respective sub-regions from the blue sub-region, the green sub-region and so on to the red sub-region. For example, the instrument pointer 105 being in the blue sub-region indicates that the vehicle speed is low; the instrument pointer 105 being in the yellow sub-region indicates that the vehicle speed is high and a careful driving is needed; the instrument pointer 105 being in the red sub-region indicates that the vehicle speed is very high and it has come into a state of dangerous driving. Therefore, the backlight source for instrument according to the present embodiment can not only reduce energy consumption, but also function as a warning reminder.

Figure 4:
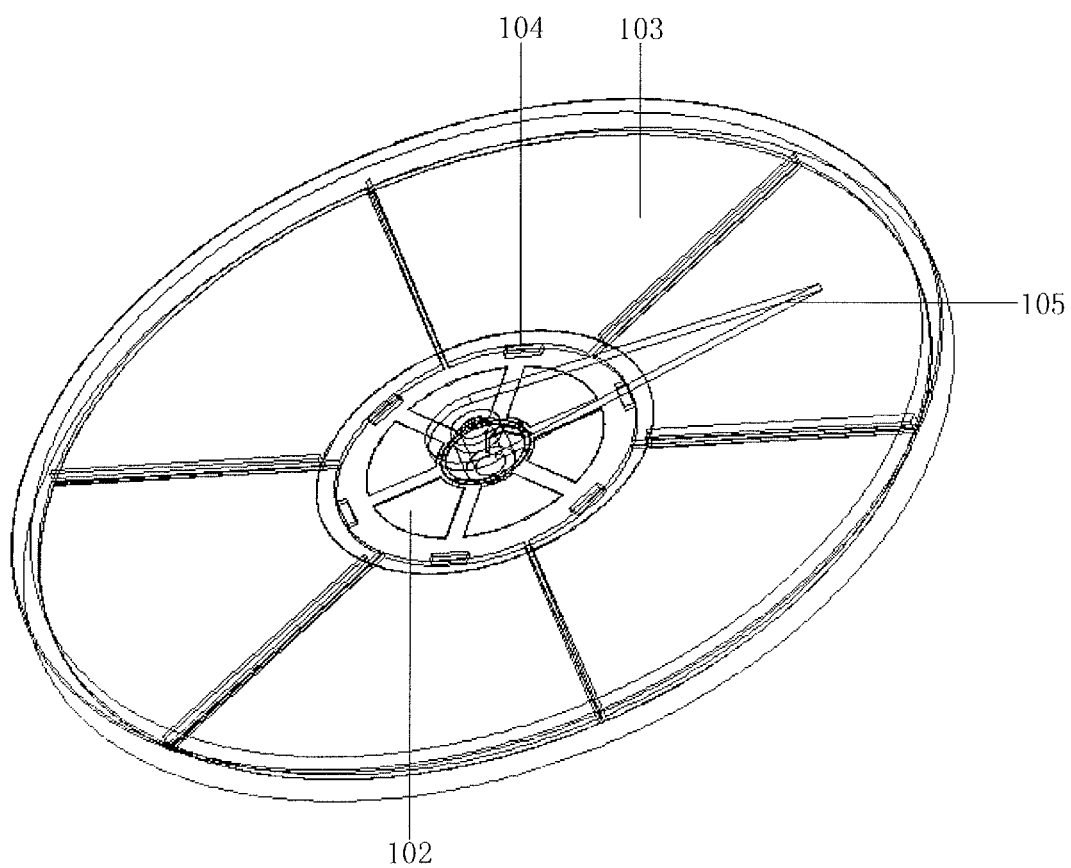
FIG. 4 is an illustrative structural view of the contact structure and the pointer structure in Embodiment One.
Figure 5:
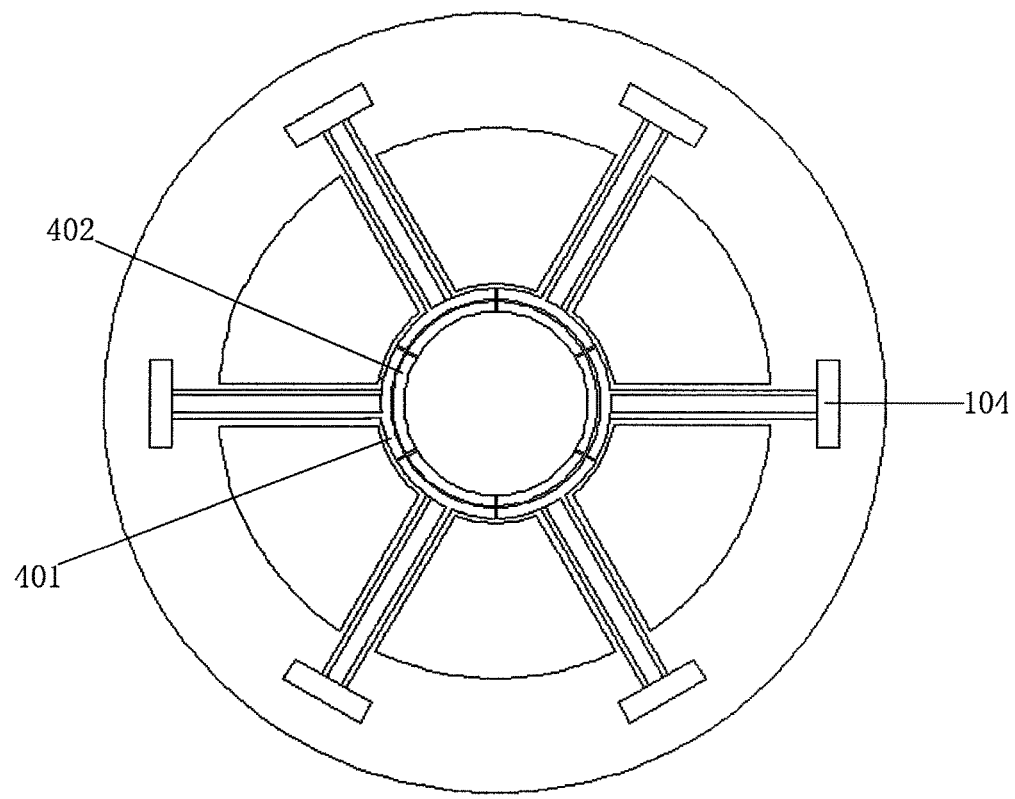
FIG. 5 is an illustrative structural view of the contact structure as illustrated in FIG. 4.

FIG. 4 is an illustrative structural view of the contact structure and the pointer structure according to Embodiment One, and FIG. 5 is an illustrative structural view of the contact structure as illustrated in FIG. 4. As illustrated in FIG. 4 and FIG. 5, the sub-region 103 is provided with a contact structure which comprises a first metal contact 401 and a second metal contact 402. The first metal contact 401 and the second metal contact 402 can be conductive metal strips. Optionally, the first metal contact 401 and the second metal contact 402 can be gold fingers. The first metal contact 401 is connected with a first electrode of the backlight source 104 and the second metal contact 402 is connected with a second electrode of the backlight source 104. Optionally, the first electrode of the backlight source 104 is a positive electrode, and the second electrode of the backlight source 104 is a negative electrode. In practical applications, the backlight source region 101 has a shape matching with the shape of the contact structure and can be of an annular structure. Optionally, the contact structure is a double-layered flexible printed circuit (FPC).

Figure 6:
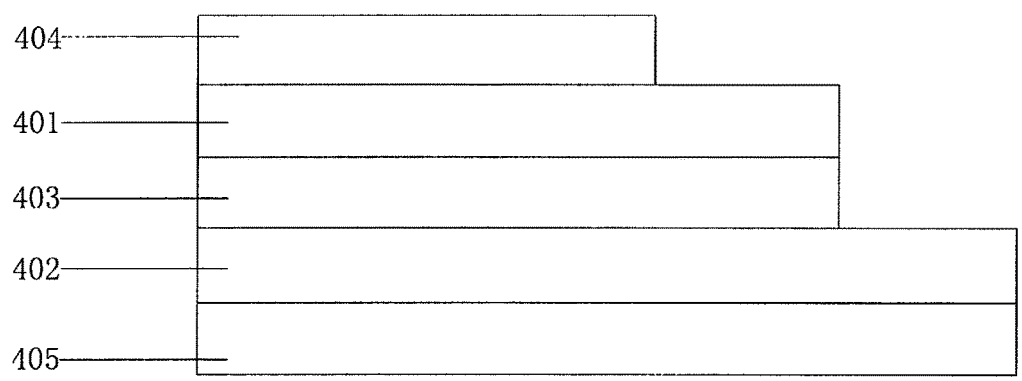
FIG. 6 is a sectional view of the contact structure as illustrated in FIG. 5.

FIG. 6 is a sectional view of the contact structure as illustrated in FIG. 5. As illustrated in FIG. 6, the contact structure further comprises a first insulating layer 403, a second insulating layer 404 and a third insulating layer 405. The first insulating layer 403 is disposed between the first metal contact 401 and the second metal contact 402, the second insulating layer 404 is disposed above the first metal contact 401, and the third insulating layer 405 is disposed below the second metal contact 402. In the present embodiment, the contact structure is an annular structure in which the first metal contact 401 is disposed at an outer ring and the second metal contact 402 is disposed at an inner ring. Optionally, the first metal contact 401 and the second metal contact 402 are made of materials selected from a group comprising metals such as copper, and the first insulating layer 403, the second insulating layer 404 and the third insulating layer 405 are made of materials selected from a group comprising polyimide.

Figure 7:
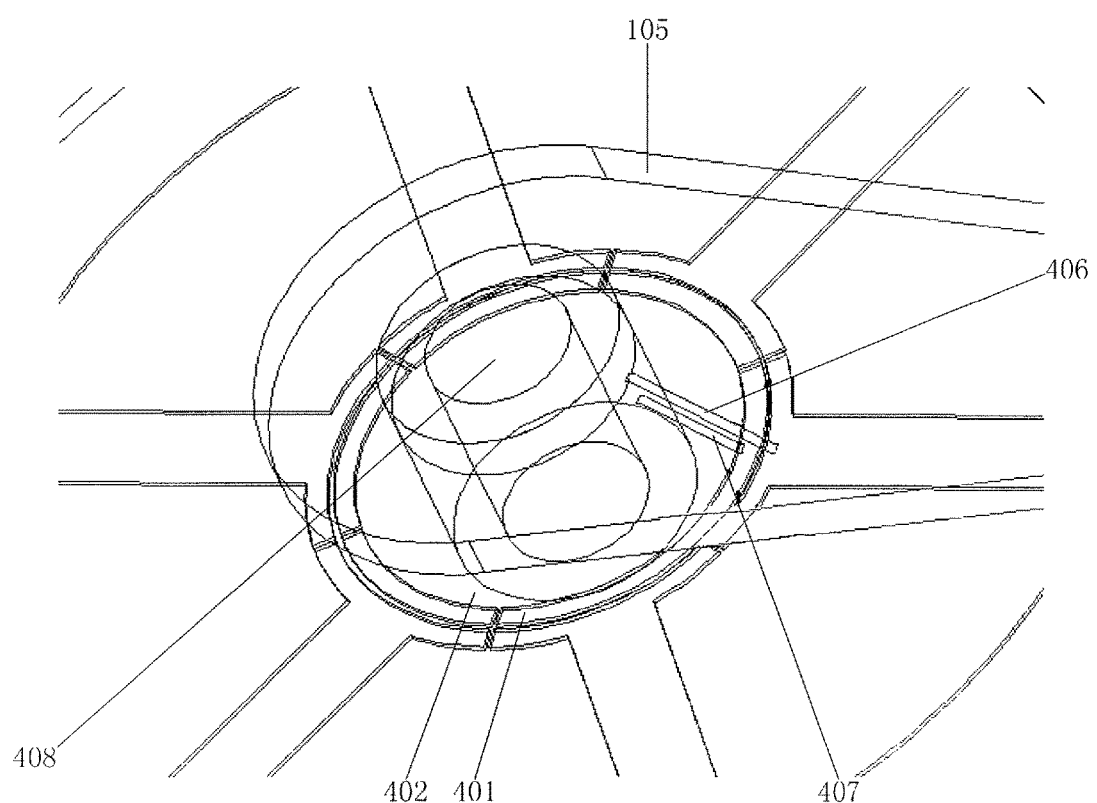
FIG. 7 is an illustrative structural view of the pointer structure as illustrated in FIG. 4.

FIG. 7 is an illustrative structural view of the pointer structure as illustrated in FIG. 4. As illustrated in FIG. 7, the pointer region 102 is provided with a probe structure comprising a first conductive probe 406 and a second conductive probe 407. The instrument pointer 105 is fixedly connected to a rotation shaft 408. The first conductive probe 406 and the second conductive probe 407 are fixedly connected, for example through the rotation shaft 408, with the instrument pointer 105. When the instrument pointer 105 is rotated, the probe structure fixedly connected with the rotation shaft 408 is rotated synchronously. The first conductive probe 406 is connected with a first electrode of the power supply, and the second conductive probe 407 is connected with a second electrode of the power supply. Optionally, the first electrode of the backlight source 104 is a positive electrode, the second electrode of the backlight source 104 is a negative electrode, the first electrode of the power supply is a positive electrode, and the second electrode of the power supply is a negative electrode.

In the present embodiment, when the instrument pointer 105 is rotated into the sub-region, the first metal contact 401 corresponding to the sub-region is connected with the first conductive probe 406, while the second metal contact 402 corresponding to the sub-region is connected with the second conductive probe 407. Thus, the backlight source of the sub-region can emit light separately. At this time, the backlight source corresponding to the sub-region emits light individually, so that the backlight source is saved and the energy consumption is reduced.

In one embodiment of the present disclosure, the contact structure is disposed close to a border of the pointer region. The first metal contact 401 is disposed above the second metal contact 402, and the first conductive probe 406 is configured so that the bottom thereof is disposed above the bottom of the second conductive probe 407. Therefore, the probe structure and the contact structure are matched with each other, thereby ensuring that the first metal contact 401 and the second metal contact 402 can be simultaneously in contact with the first conductive probe 406 and the second conductive probe 407 respectively.

In the present embodiment, the first conductive probe 406 and the second conductive probe 407 are arranged in the same plane in the vertical direction. For example, a plurality of the contact structures are separated from each other. The first conductive probe 406 has a width in an arranging direction of adjacent first metal contacts 401 greater than an interval between adjacent first metal contacts. The second conductive probe 407 has a width in an arranging direction of adjacent second metal contact 402 greater than an interval between adjacent second metal contacts. Therefore, it can be avoided that none of the backlight sources emits light.

The backlight source for instrument according to the present embodiment comprises a backlight source region and a pointer region. The backlight source region comprises at least two sub-regions, each of which is provided with a backlight source independently. The pointer region is provided with an instrument pointer. When the instrument pointer is turned into one of the sub-regions, the backlight source which corresponds to the sub-region emits light individually, and thus the backlight source is saved and the energy consumption is reduced. In addition, the backlight sources corresponding to different sub-regions according to the present embodiment emit light of different colors, and the backlight sources of different colors are sequentially arranged according to warning degree and thus have warning and alarming functions.

Embodiment Two

The present embodiment provides an instrument comprising the backlight source for instrument according to Embodiment One as described above. A description of the structure of the instrument backlight source will be omitted here, as a reference can be made to the description in Embodiment One.

In the instrument according to the present embodiment, the backlight source for instrument comprises a backlight source region and a pointer region. The backlight source region comprises at least two sub-regions, each of which is provided with a backlight source separately. The pointer region is provided with an instrument pointer. When the instrument pointer is turned into one of the at least two sub-regions, the backlight source which corresponds to the sub-region emits light individually, and thus the backlight source is saved and the energy consumption is reduced. In addition, the backlight sources corresponding to different sub-regions according to the present embodiment emit light of different colors, and the backlight sources of different colors are sequentially arranged according to warning degree and thus have warning and alarming functions.

Embodiment Three

The embodiment of the present disclosure provides an operation method of the backlight source for instrument. The backlight source for instrument comprises a backlight source region and a pointer region. The backlight source region surrounds the pointer region and comprises at least two sub-regions, each of which is provided with a backlight source separately. The pointer region is provided with an instrument pointer. The structure and configuration of the instrument backlight source will be omitted here, as a reference can be made to the description in Embodiment One.

The operation method comprises that when the instrument pointer is turned into one of the sub-regions, the backlight source which corresponds to the sub-region emits light individually.

Referring to FIG. 2, the instrument pointer 105 is pointed to the sub-region 103 and the backlight source corresponding to the sub-region 103 emits light individually. Therefore, the backlight source is saved and the energy consumption is reduced.

Referring to FIG. 4 and FIG. 5, the sub-region 103 is provided with a contact structure comprising a first metal contact 401 and a second metal contact 402. The first metal contact 401 is connected with a first electrode of the backlight source 104 and the second metal contact 402 is connected with a second electrode of the backlight source 104. Optionally, the first electrode of the backlight source 104 is a positive electrode, and the second electrode of the backlight source 104 is a negative electrode. In practical applications, the backlight source region 101 has a shape matching with the shape of the contact structure and can be a double-layered annular flexible printed circuit.

Referring to FIG. 7, the pointer region 102 is provided with a probe structure comprising a first conductive probe 406 and a second conductive probe 407. The instrument pointer 105 is rotated by a rotation shaft 408. The first conductive probe 406 and the second conductive probe 407 are fixedly connected, for example through the rotation shaft 408, with the instrument pointer 105. In addition, the first conductive probe 406 and the second conductive probe 407 can be directly disposed on the instrument pointer 105. When the instrument pointer 105 is rotated, the probe structure is rotated synchronously by the rotation shaft 408. The first conductive probe 406 is connected with a first electrode of the power supply, and the second conductive probe 407 is connected with a second electrode of the power supply. Optionally, the first electrode of the backlight source 104 is a positive electrode, the second electrode of the backlight source 104 is a negative electrode, the first electrode of the power supply is a positive electrode, and the second electrode of the power supply is a negative electrode.

In the present embodiment, when the instrument pointer 105 is rotated into the sub-region 103, the first metal contact 401 corresponding to the sub-region 103 is connected with the first conductive probe 406, while the second metal contact 402 corresponding to the sub-region 103 is connected with the second conductive probe 407. Thus, the backlight source of the sub-region can emit light individually. At this time, the backlight source corresponding to the sub-region illuminates individually, so that the backlight source is saved and the energy consumption is reduced.

In the operation method of the instrument backlight source according to the present embodiment, the instrument backlight source comprises a backlight source region and a pointer region. The backlight source region comprises a plurality of sub-regions which are provided with backlight sources. The pointer region is provided with an instrument pointer. When the instrument pointer is turned into one of the sub-regions, the backlight source which corresponds to the sub-region emits light individually, and thus the backlight source is saved and the energy consumption is reduced. In addition, the backlight sources corresponding to different sub-regions according to the present embodiment emit light of different colors, and the backlight sources of different colors are sequentially arranged according to warning degree and thus have warning and alarming functions.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201510312784.6 filed on Jun. 9, 2015, the disclosure of which is hereby entirely incorporated by reference as a part of the present disclosure.

The invention claimed is:

1. A backlight source for instrument, comprising a backlight source region and a pointer region, the backlight source region surrounding the pointer region and comprising at least two sub-regions each of which is provided with a backlight source;
   the pointer region having an instrument pointer provided therein;
   the backlight source region configured such that when the instrument pointer is turned into one of the at least two sub-regions, the backlight source which corresponds to the sub-region emits light individually;
   wherein each of the at least two sub-regions is provided with a contact structure independently which comprises a first metal contact and a second metal contact, the first metal contact is connected with a first electrode of the backlight source and the second metal contact is connected with a second electrode of the backlight source;
   the pointer region is provided with a probe structure comprising a first conductive probe and a second conductive probe, the first conductive probe and the second conductive probe are fixedly disposed with respect to the instrument pointer, the first conductive probe is connected with a first electrode of a power supply, and the second conductive probe is connected with a second electrode of the power supply:
   where the instrument pointer is rotated into the sub-region, the first metal contact corresponding to the sub-region is connected with the first conductive probe, and the second metal contact corresponding to the sub-region is connected with the second conductive probe.

2. The backlight source for instrument according to claim 1, wherein the backlight sources corresponding to adjacent sub-regions among the at least two sub-regions emit light of different colors.

3. The backlight source for instrument according to claim 1, wherein the first conductive probe and the second conductive probe are fixedly disposed with respect to the instrument pointer through a rotation shaft.

4. The instrument backlight source for instrument according to claim 1, wherein the first conductive probe and the second conductive probe can be directly disposed on the instrument pointer.

5. The backlight source for instrument according to claim 1, wherein the contact structure is disposed close to the pointer region, the first metal contact is disposed above the second metal contact, and the first conductive probe has its bottom disposed above the bottom of the second conductive probe, so that the probe structure and the contact structure are matched with each other.

6. The backlight source for instrument according to claim 1, wherein the contact structures of the at least two sub-regions are spaced apart from each other, the first conductive probe has a width in an arranging direction of adjacent first metal contacts greater than an interval between adjacent first metal contacts, and the second conductive probe has a width in an arranging direction of adjacent second metal contact greater than an interval between adjacent second metal contacts.

7. The backlight source for instrument according to claim 1, wherein the contact structure further comprises a first insulating layer which is disposed between the first metal contact and the second metal contact.

8. The backlight source for instrument according to claim 1, wherein the contact structure further comprises a second insulating layer and a third insulating layer, the second insulating layer is disposed above the first metal contact, and the third insulating layer is disposed below the second metal contact.

9. The backlight source for instrument according to claim 1, wherein each of the at least two sub-regions has the same shape and/or area.

10. The backlight source for instrument according to claim 1, wherein the backlight source of each of the at least two sub-regions has a color sequentially arranged according to warning degree.

11. The backlight source for instrument according to claim 1, wherein the backlight source region is an annular region and the pointer region is a circular region.

12. The backlight source for instrument according to claim 1, wherein each of the backlight source region and the pointer region is a sector region.

13. An instrument comprising a backlight source, the backlight source comprising a backlight source region and a pointer region, the backlight source region surrounding the pointer region and comprising at least two sub-regions each of which is provided with a backlight source;
the pointer region having an instrument pointer provided therein;
the backlight source region configured such that when the instrument pointer is turned into one of the at least two sub-regions, the backlight source which corresponds to the sub-region emits light individually;
wherein each of the at least two sub-regions is provided with a contact structure independently which comprises a first metal contact and a second metal contact, the first metal contact is connected with a first electrode of the backlight source and the second metal contact is connected with a second electrode of the backlight source;
the pointer region is provided with a probe structure comprising a first conductive probe and a second conductive probe, the first conductive probe and the second conductive probe are fixedly disposed with respect to the instrument pointer, the first conductive probe is connected with a first electrode of a power supply, and the second conductive probe is connected with a second electrode of the power supply;
where the instrument pointer is rotated into the sub-region, the first metal contact corresponding to the sub-region is connected with the first conductive probe, and the second metal contact corresponding to the sub-region is connected with the second conductive probe.

14. An operation method of a backlight source for instrument, wherein the instrument backlight source comprises a backlight source region and a pointer region, the backlight source region surrounds the pointer region and comprises at least two sub-regions each of which is provided with a backlight source independently, and the pointer region is provided with an instrument pointer,
the operation method comprises:
when the instrument pointer is turned into one of the at least two sub-regions, the backlight source which corresponds to the sub-region emits light individually;
wherein each of the at least two sub-regions is provided with a contact structure which comprises a first metal contact and a second metal contact, the first metal contact is connected with a first electrode of the backlight source and the second metal contact is connected with a second electrode of the backlight source;
the pointer region is provided with a probe structure comprising a first conductive probe and a second conductive probe, the first conductive probe and the second conductive probe are fixedly connected with the instrument pointer, the first conductive probe is connected with a first electrode of a power supply, and the second conductive probe is connected with a second electrode of the power supply:
the step in which when the instrument pointer is turned into one of the at least two sub-regions, the backlight source which corresponds to the sub-region emits light individually comprises:
where the instrument pointer is turned into the sub-region, the first metal contact corresponding to the sub-region is connected with the first conductive probe, and the second metal contact corresponding to the sub-region is connected with the second conductive probe.

15. The operation method of a backlight source for instrument according to claim 14, wherein the backlight source of each of the at least two sub-regions has a color sequentially arranged according to warning degree.

16. The backlight source for instrument according to claim 3, wherein the contact structure is disposed close to the pointer region, the first metal contact is disposed above the second metal contact, and the first conductive probe has its bottom disposed above the bottom of the second conductive probe, so that the probe structure and the contact structure are matched with each other.

17. The backlight source for instrument according to claim 4, wherein the contact structure is disposed close to the pointer region, the first metal contact is disposed above the second metal contact, and the first conductive probe has its bottom disposed above the bottom of the second conductive probe, so that the probe structure and the contact structure are matched with each other.

* * * * *